(12) United States Patent
Hill

(10) Patent No.: US 7,382,952 B2
(45) Date of Patent: Jun. 3, 2008

(54) OPTICAL FIBER/WAVEGUIDE POLARIZER AND METHOD OF FABRICATION

(75) Inventor: Kenneth O. Hill, Kanata (CA)

(73) Assignee: Her Majesty the Queen in Right of Canada as represented by the Minister of Industry, Through the Communications Research Centre Canada, Ottawa (CA)

( * ) Notice: Subject to any disclaimer, the term of this patent is extended or adjusted under 35 U.S.C. 154(b) by 100 days.

(21) Appl. No.: 11/234,228

(22) Filed: Sep. 26, 2005

(65) Prior Publication Data

US 2006/0067618 A1 Mar. 30, 2006

Related U.S. Application Data

(60) Provisional application No. 60/612,948, filed on Sep. 27, 2004.

(51) Int. Cl.
G02B 6/34 (2006.01)
G02B 6/02 (2006.01)
G02F 1/035 (2006.01)

(52) U.S. Cl. .............................. 385/37; 385/3; 385/123

(58) Field of Classification Search .................. 385/37, 385/3, 123
See application file for complete search history.

(56) References Cited

U.S. PATENT DOCUMENTS

| | | | |
|---|---|---|---|
| 6,282,341 B1 * | 8/2001 | Digonnet et al. ............. | 385/37 |
| 6,430,342 B1 | 8/2002 | Kim et al. ..................... | 385/37 |
| 6,465,153 B1 * | 10/2002 | Kewitsch et al. ............ | 430/290 |
| 6,661,942 B1 * | 12/2003 | Gharavi ........................ | 385/16 |
| 6,747,798 B2 * | 6/2004 | Kristensen et al. .......... | 359/566 |
| 6,751,380 B1 * | 6/2004 | Imamura et al. .............. | 385/37 |
| 2002/0015919 A1 * | 2/2002 | Kristensen et al. .......... | 430/321 |
| 2003/0026518 A1 * | 2/2003 | Pezeshki et al. .............. | 385/14 |
| 2003/0059195 A1 * | 3/2003 | Brennan et al. ............. | 385/146 |
| 2003/0123497 A1 * | 7/2003 | Huang et al. .................. | 372/21 |
| 2004/0028331 A1 * | 2/2004 | Ishii et al. ..................... | 385/37 |
| 2005/0018714 A1 * | 1/2005 | Fermann et al. ............... | 372/6 |

OTHER PUBLICATIONS

"Curvature and Microbending Losses in Single-Mode Optical Fibres", Optical and Quantum Electronics Vol. 11, pp. 43-59, 1979.

* cited by examiner

*Primary Examiner*—K. Cyrus Kianni
(74) *Attorney, Agent, or Firm*—Teitelbaum & MacLean; Neil Teitelbaum; Doug MacLean

(57) ABSTRACT

The invention relates to an optical fiber polarizer comprising an optical fiber with at least a core, a cladding and surrounding medium (or outer cladding) where one or more sections of the optical fiber include periodic/aperiodic (chirped, quasi-periodic) modulation of the dielectric properties of the fiber in the direction of propagation of the light (the longitudinal axis of the fiber). The modulation of the dielectric properties of the fiber is such that it introduces periodic/aperiodic birefringence along the direction of propagation of the light, such a modulation usually but not necessarily being confined to the vicinity of the core region of the fiber. Means are included to attenuate preferentially some of the modes of propagation of the fiber, specifically modes of one principal state of polarization and not the orthogonal state of polarization.

7 Claims, 5 Drawing Sheets

Distance along the optical waveguide/fiber

OPTICAL FIBER/WAVEGUIDE POLARIZER AND METHOD OF FABRICATION

CROSS-REFERENCE TO RELATED APPLICATIONS

The present invention claims priority from U.S. Provisional Patent Application No. 60/612,948 filed Sep. 27, 2004, which is incorporated herein by reference.

TECHNICAL FIELD

The present invention relates to optical media, such as optical fibers and optical waveguides, and particularly to an optical fiber/waveguide structure that functions as an optical fiber/waveguide core-mode polarizer.

BACKGROUND OF THE INVENTION

Polarizers are well known devices in classical optics, and are used to preferentially attenuate light/electromagnetic radiation polarized in one direction (along one of the principal polarization axes of the polarizer) and allow transmission of the orthogonally polarized radiation.

There are several types of polarizers available including:
i) prism polarizers, such as the Glan-type prism polarizers and the Nicol-type prism polarizers,
ii) polarizing beam splitters, such as the Rochon, Senarmont, and Wollaston polarizers,
iii) dichroic polarizers, which are based on the fact that dichroic material absorbs light polarized in one direction more strongly than light polarized at right angles to that direction. The most common materials used as dichroic polarizers are stretched polyvinyl alcohol sheets treated with absorbing dyes or polymeric iodine, commonly marketed under the trade name Polaroid, and
iv) wire-grid and grating polarizers, which transmit radiation whose E vector is vibrating perpendicular to the grid wires and reflect radiation with the E vector vibrating parallel to the wires when the wavelength $\lambda$ is much longer than the grid spacing d. When $\lambda$ is comparable to d, both polarization components are transmitted).

A linear polarizer is any device which, when placed in an incident unpolarized beam, transmits a beam of light whose electric vector is vibrating primarily in one plane, with only a small component vibrating in the plane perpendicular thereto. If a polarizer is placed in a plane-polarized beam and is rotated about an axis parallel to the beam direction, the transmittance of the plane-polarized beam, T will vary between a maximum value $T_1$ and a minimum value $T_2$ according to the law:

$$T=(T_1-T_2)\cos^2(\theta)+T_2.$$

where $T_1$ and $T_2$ are called the principal transmittances, in general $T_1 \gg T_2$; $\theta$ is the angle between the plane of the principal transmittance $T_1$ and the plane of vibration of the electric vector of the incident beam.

The ratio of minimum transmission to maximum transmission of a polarizer as a function of the direction of linear polarization of the incident radiation beam is known as the extinction ratio of the polarizer given by the expression $$\rho=T_2/T_1.$$

It is often advantageous to make use of optical fiber/waveguide polarizers in optical systems, such as communication systems and sensor systems, whenever the systems incorporate optical fiber waveguides and planar waveguide devices in their architecture.

Polarizers are necessary to implement polarization-sensitive devices, such as many electro-optic modulators, and in polarization-sensitive applications, such as fiber gyroscopes. Forming overlays that selectively couple one polarization out of the guide can form polarizers on dielectric waveguides that support both transverse electric (TE) and transverse magnetic (TM) propagation. For example, a plasmon polarizer, formed on $LiNbO_3$ by coating over the guide with a $Si_3N_4/Au/Ag$ thin-film sandwich, selectively attenuates the TM mode. In some materials it is possible to form waveguides that only support one polarization (the other polarization is not guided and any light so polarized radiates into the substrate). In fact, one of the earliest fiber polarizers that was demonstrated made use of a highly birefringent fiber that supported only one polarization. By inserting short (mm) lengths of such guides in circuits or alternatively forming entire circuits from these polarizing guides, high extinction ratios can be obtained. For example, annealed proton exchange (APE) waveguides in $LiNbO_3$ exhibit polarization extinction ratios of at least 60 dB. These devices are complex and expensive and suffer from an index of refraction mismatch with optical fiber waveguides.

Optical fiber/waveguide polarizers are available that share their operating principles with the polarizers of classical bulk optics. For example, polarizing dichroic material can be introduced between two axially aligned optical waveguides. The polarizing dichroic material will polarize light transmitted across the junction between the waveguides. However, such a device has some intrinsic limitations. The extinction ratio of the device will be limited by the optical properties of the polarizing dichroic material taken together with the maximum thickness of the material that can be introduced between the two optically connected waveguides. It is well known that bridging losses increase with separation between optically connected waveguides. Therefore, the maximum thickness of polarizing dichroic material that can be used is limited by the need to ensure that the bridging losses between the waveguides are kept below an acceptable value.

The limitation on the allowable gap between optically connected waveguides can be mitigated by using the beam expansion methods of micro-optics. By collimating the beam radiated by the transmitting waveguide using a lens, and refocusing the collimated beam with a second lens into the receiving waveguide, a tolerable gap is created between the lenses. The longer the focal length of the lenses, the greater is the gap size. In this type of configuration all that is needed to make a polarizer is to introduce between the collimating lenses any one of the classical bulk optic polarizers, such as prism polarizer or a polarizing beam splitter. The micro-optic approach suffers from the need to maintain critical alignment of all the optical components that comprise it. Furthermore, the devices are relatively bulky in practice.

Optical fiber that is tightly wound around a mandrel suffers from radiation losses. For a given principal polarization, these losses increase suddenly as the wavelength of the transmitted light increases above a characteristic wavelength value. The value of such a characteristic wavelength is polarization-dependent. Therefore, a properly wound fiber will act as a polarizer over a spectral range (between the two characteristic wavelength values associated with the two principal polarization states) where one polarization mode is lossy and the orthogonal polarization mode is relatively lossless. This device is bulky and suffers from performance limitations including narrow-bandwidth operation.

Another form of optical waveguide polarizer is based on a fused bi-conical taper coupler with polarization-dependent coupling characteristics. Ensuring that light of one polarization couples over while the light of orthogonal polarization does not, is all that is necessary to implement such a polarizer. In practice these polarizers suffer from poor extinction ratio and are usually narrowband in operation.

Fiber polarizers can also be made based on the polarizing properties of polymer-dispersed liquid crystals. Such a liquid crystal is placed between two coaxially aligned fibers. The liquid crystal scatters one polarization and transmits the other.

The cylindrical symmetry of an optical fiber leads to a natural decoupling of the radial and tangential components of the electric field vector. These polarizations are, however, so nearly degenerate that a fiber of circular symmetry is generally described in terms of orthogonal linear polarizations. This near-degeneracy is easily broken by any stresses or imperfections, which break the cylindrical symmetry of the fiber. Any such breaking of symmetry (which may arise accidentally or be introduced intentionally in the fabrication process) will result in two orthogonally polarized modes with slightly different propagation constants. These two modes need not be linearly polarized; in general, they are two elliptical polarizations. Such polarization splitting is referred to as birefringence.

U.S. Pat. No. 6,430,342, incorporated herein by reference, in the name of Kim issued Aug. 6, 2002, discloses a device having a mechanical fiber grating that can serve as an optical filter, such as a polarizer. In particular, the fiber grating according to Kim's disclosure has asymmetric mode coupling characteristics, so that it can be prevalently applied to an optical fiber notch filter, an optical fiber polarizer, an optical fiber wavelength tunable bandpass filter, an optical fiber frequency shifter and so on. Although Kim's device appears to perform its intended function, it is thought to be less than optimal as it is based on mechanically deforming the fiber to achieve these results.

More specifically, Kim's description of the best mode for carrying out the invention involves the mechanical formation of stepped microbends. Firstly a small portion of fiber section is melted with an electric arc discharge while it has been placed under shear bending stress. Upon cooling, the microbend deformation becomes permanent. The process is repeated at approximate beat-length intervals to create a long-period grating with many microbends. There are several disadvantages to devices fabricated using this structure and process. Firstly, because the grating consists of many microbends, it is necessarily long, so the stressing conditions can change appreciably as the process progresses along the fiber axis, due to the varying distance from the respective fixing boards 110 and 112 in FIG. 6B respectively. This compromises the precise control of the process, primarily the stress magnitude and the repeatability, thereby potentially reducing the reliability and manufacturing yield. Furthermore, using an electric discharge arc for locally heating the optical fiber has certain positional precision problems associated with it. It is also known that microbends cause scattering or out-coupling of both polarisation states from the optical fiber, which tends to increase the overall insertion loss in the device. As Gambling et al. describe in Optical and Quantum Electronics Vol. 11, pages 43-59, 1979, not only does the radius of curvature of the microbend affect the bending loss, but also the transition from a straight portion of fiber to a curved portion can give rise to additional loss, known as "transition loss" due to mode conversion and energy redistribution. Controlling the geometry of such transitions requires a very complex fabrication process, which may not be practical for commercial manufacturing. It is important to note that while both types of the above losses posses some polarization dependence which can be utilized for the fabrication, both add to the overall losses in the device. Finally, in the finished device the microbends created in the fabrication process constitute discontinuities in the fiber profile, probably creating mechanical stress concentration spots as well as points of residual stress, whereby the device reliability and robustness is impacted negatively.

In contrast, the instant disclosure teaches the use of a laser beam with attendant improved precision and control of the fabrication process. Furthermore, the described polariser retains its essentially straight geometry, thus reducing the likelihood of unwanted stress concentrations and practically eliminating the insertion losses consisting of bending loss and transition loss.

It is an object of this invention to provide a grating that is photo-induced resulting in an inexpensive, reliable high performance in-fiber polarizer.

Modes of an Optical Fiber

An optical fiber generally supports three types of modes: core-guided modes, cladding-guided modes and radiation modes. The modes of an optical fiber are the characteristic solutions of Maxwell's electromagnetic field equations for an optical fiber geometry that is invariant in translation along its longitudinal axis. For a given optical frequency, the modes of an optical fiber obey boundary conditions that ensure the continuity of the tangential component of the electrical and magnetic field vectors at all the boundaries. As well, the modal solutions must meet the requirement that all the modes that the fiber supports be restricted to carry a finite amount of power. The optical power carried by a core-guided mode is confined mainly to the core. The diameter of the core is usually about ten times less than the diameter of the cladding. The power carried by a cladding-guided mode is confined mainly to the cladding. The power carried by a radiation mode in the radiation continuum is not bound to the optical fiber. The physical quantity that determines the type of mode in question is the effective index of the mode. The effective index of the modes is an eigenvalue, which is obtained from the electromagnetic field equation solutions for the optical fiber structure. The effective, index of a core-guided mode lies between the refractive index of the core and the refractive index of the cladding in the case of a three-layer step index optical fiber consisting of a core, a cladding and a surrounding medium, that is, an outer cladding. The effective index of a cladding-guided mode for the same structure lies between the refractive index of the cladding and of the medium surrounding the fiber, that is, the outer cladding. An optical fiber is monomode if it supports only one core-guided mode. The condition for monomode propagation in the case of a three-layer step index optical fiber is well known: the normalized frequency of the core must be less than approximately 2.405. If the normalized frequency of the core becomes less than approximately 1.0 the light is, no longer guided primarily in the core and becomes cladding guided.

Without loss of generality, we can describe the invention with reference to commercially available monomode optical fibers. It will be clear to anyone familiar with the state-of-the-art that the general teachings of the invention will apply to other optical fibers as well, including multimode optical fibers and polarization-maintaining optical fibers.

Typical Optical Fiber

A typical optical fiber for use in optical communication systems is fabricated using low loss dielectric materials, usually high-purity fused silica and doped fused silica glass. The function of the dopant is to create the index of refraction contrast that differentiates optically the core region of the fiber from the cladding region. Usually the cladding is made of pure fused silica and the core is made from Germanium-doped silica. The effect of the Germanium dopant is to raise the index of refraction of the fused silica in the core. Thus, the fiber consists of a high refractive index core and a low refractive index cladding. Such optical fibers are commercially available. For example, Corning Inc. manufactures SMF-28 fiber (which is used extensively) that has low attenuation in the 1310 nm and the 1550 m transmission windows. The fiber supports a single (polarization independent) optical mode of propagation and is suitable for use in optical communication systems. Such a fiber has the following approximate characteristics:

Core radius: 4.15 microns
Cladding radius: 62.5 microns
Core index of refraction at (1310 nm): 1.4519
Cladding index of refraction (1310 nm): 1.4468
High degree of circular symmetry
Low transmission loss (less than 0.5 dB/Km)

The polarizer, according to the present invention, can be made in such an optical fiber/waveguide.

Optical fibers with more complex index-of-refraction profiles than those of a three-layer refractive index profile fiber do exist; however the general method of fabricating an optical fiber according to the present invention applies also to such fibers with obvious modifications.

Birefringence

Crystalline materials may have different indices of refraction associated with different crystallographic directions. Commonly, mineral crystals having two distinct indices of refraction are called birefringent materials.

If the y- and z-directions are equivalent in terms of the crystalline forces, then the x-axis is unique and is called the optic axis of the material. The propagation of light along the optic axis would be independent of its polarization; its electric field, E, is everywhere perpendicular to the optic axis and it is called the ordinary- or o-wave.

The light wave with E-field parallel to the optic axis is called the extraordinary- or e-wave.

Birefringence, B, is defined by $$B = n_o - n_e,$$

where $n_o$ is the ordinary index of refraction; and
$n_e$ is the extraordinary index of refraction.

Birefringent materials are used widely in optics to produce polarizing prisms and retarder plates, such as the quarter-wave plate. Putting a birefringent material between crossed polarizers can give rise to interference colors.

A widely used birefringent material is calcite. Its birefringence is extremely large, with indices of refraction for the o- and e-rays of 1.6584 and 1.4864 respectively.

Normally optical waveguides are manufactured to be non-birefringent. Because the typical materials (i.e. fused silica, plastic) used in the fabrication of optical waveguides are homogeneous and isotropic, and the waveguide cross-section is properly shaped, the experimentally observed optical waveguide birefringence is usually small.

In optical waveguides/fibers the birefringence that is experienced by a propagating mode can arise due to three factors:

Lack of π/2 rotational symmetry of the optical waveguide about the axis of propagation, called shape birefringence;

Stress acting transversely on the waveguide creating an optic axis in the direction of the applied stress (even in materials that in unstressed form are homogeneous and isotropic); stress birefringence is used in order to fabricate polarization-maintaining fibers; and The use of intrinsically birefringent crystalline materials in the fabrication of the waveguide (e.g. Lithium Niobate).

Photo-Fabrication of Birefringent Optical Waveguides in Transparent Dielectric Material Birefringent optical waveguides can be fabricated within transparent dielectric materials, usually glasses by means of a focused beam of light. Such waveguides exhibit process-controlled levels of optical birefringence.

It is well know that focusing a laser beam in the interior of a dielectric material can change the refractive index of the material in the focal region. M edification of the refractive index of the material occurs when the peak power density of the laser beam at its focus in the material is greater than some peak-power-density threshold value. This threshold is a function of general experimental conditions, the laser wavelength, the optical properties of the material and the pulse duration. The wavelength of the laser is chosen with associated single-photon energy to be less than the absorption band edge of the dielectric material whose index of refraction is to be modified. Thus, the material is transparent at the laser wavelength, as long as power density in the material remains below the characteristic power density threshold.

Efficient multiphoton absorption processes and laser-induced refractive index modification in the focal volume begin to occur when the incident peak power density of the focused beam inside the material exceeds the characteristic threshold for refractive index modification. Typically, the focal volume over which refractive index modification occurs is ellipsoidal in shape, characterized by a waist diameter and a characteristic length. The waist diameter is controlled mainly by the tightness of the laser beam focus and by the absorption-process order, whereas the characteristic length of the ellipsoid depends not only on beam focus and the process order but also on the multiphoton absorption coefficient at the focal point. The dimensions of the focal volume are the order of a few microns.

Relative motion between the focal point and the sample is used to trace out a waveguide, either by translating the sample or by translating the focal point within the sample in a continuous or quasi-continuous manner.

Modification of the index of refraction of the focal volume can be induced by a single pulse from a pulsed laser, by multiple laser pulses acting sequentially on the focal volume or by light from a CW laser. The choice of laser affects the efficiency of the index-modification process. It is clear that modification of the index of refraction of a transparent dielectric material requires that laser energy be absorbed. The laser-beam-induced index of refraction change increases, at least initially, with absorbed energy density, that is the irradiation dose.

There are several lasers available that are suitable for the refractive index modification of transparent dielectric materials. Such lasers include: the $F_2$, KrF, ArF lasers, all UV sources, and femtosecond lasers that operate in the visible and the infrared regions of the spectrum.

The effectiveness of this process hinges on the recognition that when laser energy is absorbed in the focal volume, the temperature in the volume can increase substantially, sometimes reaching several hundred or more Centigrade, for example, with either $F_2$ or femtosecond laser illumination of the sample.

Analytical formulas are available to calculate the temperature rise with pulsed illumination. At these temperatures a dielectric material, such as glass, softens and becomes moldable. Therefore, when the dielectric material is placed under externally applied mechanical stress during laser-induced refractive index modification processing, we anticipate that the mechanical modification will occur in the moldable region of the focal volume. Upon completion of laser irradiation processing, removal of the mechanical stress then leads to a new equilibrium stress distribution in the focal region and its immediate surroundings within the material. The level of externally applied stress applied during illumination in effect becomes "frozen-in". The material in the focal region retains memory of the magnitude and direction of the applied stress during processing, albeit with a significantly different distribution. We anticipate that the stress in and around the focal volume will reach values similar to those that were present during illumination due to the externally applied mechanical stress.

A dielectric material under tensile or compressive stress exhibits the stress-optic effect, whereby the applied stress changes the index of refraction for light polarized along the direction of applied stress by a different amount than for light polarized at right angles to the applied stress. Thus the applied tensile or compressive stress leads to stress-induced birefringence in the material.

For fused silica we anticipate that the "frozen-in" stress can result in photoinduced birefringence of $1.7 \times 10^{-4}$. This value is substantial and can facilitate the fabrication of optical waveguide devices useful in sensor, integrated optics and telecommunications applications. Precise control of birefringence can be helpful in trimming the birefringence of silica-on-silicon integrated optics devices which requires tight control of birefringence levels.

Thus an efficient and practical means is disclosed whereby the application of mechanical stress to the sample affords excellent control of the locally induced residual stress level. This permits us to control both the magnitude and the sign of the birefringence that is "frozen-in".

SUMMARY OF THE INVENTION

Accordingly, the present invention relates to an optical fiber polarizer comprising:

an optical fiber with at least a core, a cladding and surrounding medium (or outer cladding);

one or more sections of the optical fiber that include periodic/aperiodic (chirped, quasi-periodic) modulation of the dielectric properties of the fiber in the direction of propagation of the light (the longitudinal axis of the fiber). The modulation of the dielectric properties of the fiber is such that it introduces periodic/aperiodic birefringence along the direction of propagation of the light, wherein such a modulation usually but not necessarily is confined to the vicinity of the core region of the fiber.

Another aspect of the present invention relates to a means to attenuate preferentially some of the modes of propagation of the fiber, specifically modes of one principal state of polarization and not the orthogonal state of polarization.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
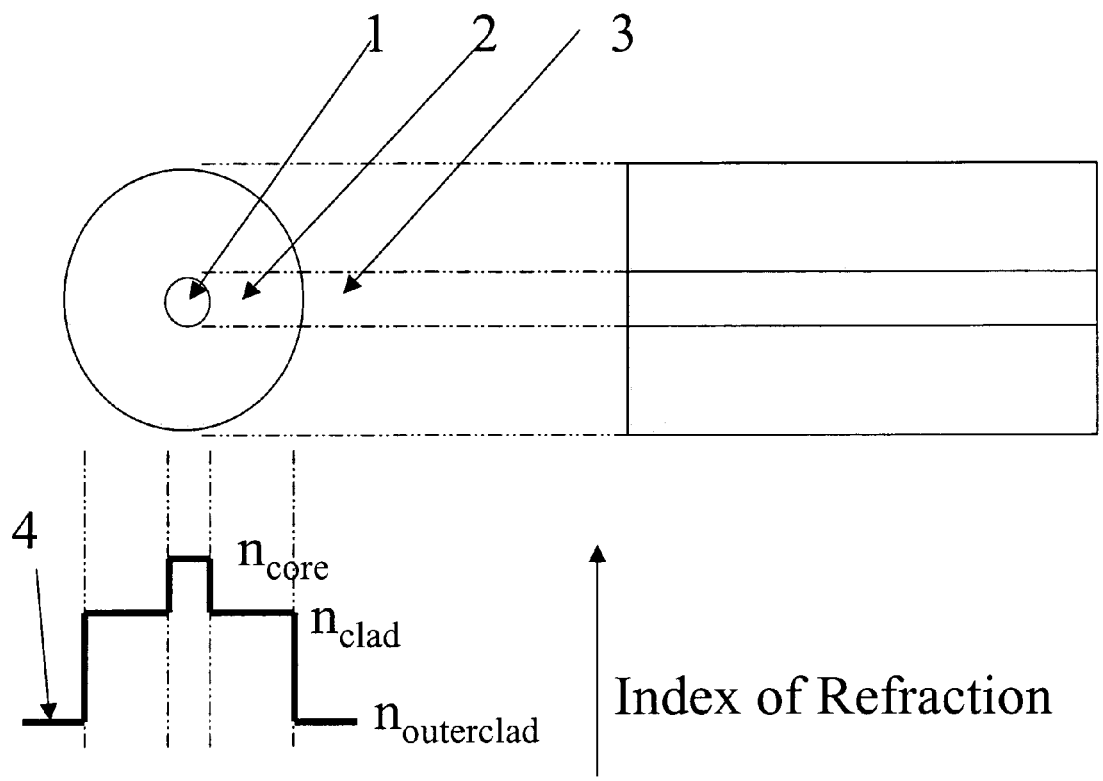
FIG. 1 illustrates a conventional single mode optical fiber and the refractive index profile thereof.

A typical prior art single mode optical fiber is presented in FIG. 1 together with a schematic cross-section of the fiber. Three regions within the fiber can be distinguished:

a) the fiber core 1 with refractive index $n_{core}$;
b) the fiber cladding 2 with refractive index $n_{clad}$;
c) the outer fiber cladding 3 with refractive index $n_{outerclad}$.

The refractive index profile 4 illustrates the approximate relative magnitudes in refractive index of the three regions.

When an optical wave propagates along the fiber, the associated electromagnetic field of the optically guided modes extend over the core 1, the cladding 2 and the outer cladding 3 where present. Each mode is characterized by a size, known as the optical mode spot size, which is typically measured between the points where the electromagnetic field intensity is at half the value of the peak intensity.

The central requirement for ensuring that there is minimal coupling to cladding modes at an interface between two distinct optical fiber/waveguide sections is that mode overlap of the fundamental core-guided modes of the two sections be maximized. That is, the spot size must remain constant across the interface. For instance, this would apply to the interfaces between the alternating birefringent sections 11, 12 in FIG. 2.

For the optical mode spot size to remain constant across an interface between two fiber sections we require that the transverse wave-number of the core, u, and of the cladding, w, each divided by the core radius, a, be constant across the interface.

$$u/a = \mathrm{SQRT}(k^2 \cdot n_{core}^2 - \beta^2).$$

$$w/a = \mathrm{SQRT}(\beta^2 - k^2 n_{clad}^2)$$

Thus we require that $u_1/a_1 = u_2/a_2$ and $w_1/a_1 = w_2/a_2$ for the mode transition from interface 1 across to interface 2, where, $\lambda$ is the wavelength $\beta = 2\pi n_{eff}/\lambda$ is the wave propagation constant $k = 2\pi n_{eff}/\lambda$ is the wave number $n_{core}$ is the refractive index of the fiber core 1, $n_{clad}$ is the refractive index of the fiber cladding 2, $n_{eff}$ is effective index of core-guided mode.

In what follows we assume, without loss of generality, that the core size of the optical fibers/waveguides of interest does not vary along the length of the optical waveguide in which the polarizer is located. Slight variations in core size can be accommodated by slight variations in refractive index profile.

Figure 2:
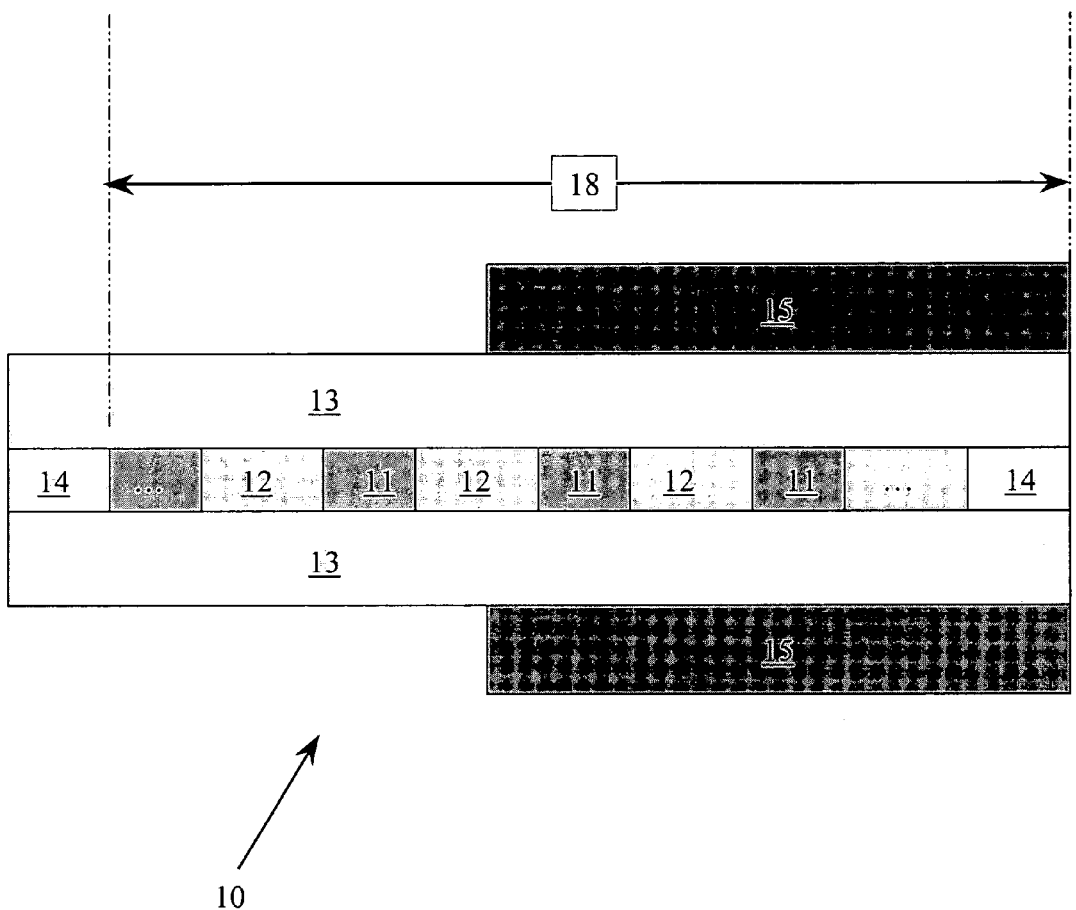
FIG. 2 is a cross-sectional view of a fiber in accordance with an embodiment of the present invention.

A cross-section of a polarizer 10 in accordance with an embodiment of the present invention is shown in FIG. 2. The polarizer 10 has a length of optical fiber 18, which contains a plurality of core sections 11 and 12 with alternating birefringence, surrounded by a cladding layer 13 with refractive index $n_{clad}$. An absorbing outer cladding layer 15, which is index matched to the cladding layer 13, covers a part of the length 18 of the polarizer 10. The polarizer 10 is coupled at both ends to a single mode fiber with core 14, having a refractive index $n_{core}$, and the cladding layer 13, with a refractive index $n_{clad}$.

The principal polarization states can be resolved into vertically and horizontally polarized components. Each of the alternating birefringent core sections 11, 12 in FIG. 2 is characterized by two indices of refraction, respectively, for the vertical and for the horizontal states of polarization of the propagating mode.

Thus, $n_{1,Vert\ core}$ is the index of refraction of the core for type 1 sections (11 in FIG. 2) for vertically polarized modes with the corresponding effective index $n_{1,Eff\ Vert}$;

$n_{1,Hor\ core}$ is the index of refraction of the core for type 1 sections (11 in FIG. 2) for horizontally polarized modes with the corresponding effective index $n_{1,Eff\ Hor}$;

$n_{2,Vert\ core}$ is the index of refraction of the core for type 2 sections (12 in FIG. 2) for vertically polarized modes with the corresponding effective index $n_{2,Eff\ Vert}$; and $n_{2,Hor\ core}$ is the index of refraction of the core for type 2 sections (12 in FIG. 2) for horizontally polarized modes; $n_{2,Eff\ Hor}$ the corresponding effective index.

Relationship Between Birefringent Indices

The refractive indices of the alternating birefringent sections 11 and 12 of the optical fiber/waveguide polarizer 10 in FIG. 2 can be related to one another in such a way that the structure will function as a polarizer. The effective index of a propagating mode polarized along one of the principal axes in the first set of sections 11 must be set to be approximately equal to the effective index of the same mode in contiguous sections 12. The effective indices for the orthogonally polarized mode are set to be unequal. When this situation occurs, a mode polarized along the "equal effective indices" direction will not be perturbed by the presence of the alternating birefringent sections. The mode, in effect, will not "see" a refractive index change at the section 1 and section 2 transitions and, consequently, will propagate undisturbed in the waveguide core.

In contrast, an orthogonally polarized mode (along the "unequal effective indices" direction) will be affected by the presence of the periodic (or chirped) structure, in a manner that is well understood. A periodic or quasi-periodic modulation of the effective refractive index of an optical waveguide will couple resonantly (obey the Bragg resonance condition, i.e. momentum conservation) to other waveguide modes of the structure (either guided modes, cladding modes or free-space/radiated modes). The coupling is described by well-known coupled mode equations.

The period/quasi-period of the polarizing structure is chosen to forward- or retro-couple the appropriately polarized mode to the most advantageous cladding modes of the structure over the design operating wavelength range of the polarizer. The waveguide is provided with a layer of index-matched and absorbing material to attenuate/absorb, as effectively as possible, cladding and free-space/radiated modes. Thus, light of one principal state of polarization propagates undisturbed in the optical waveguide core, whereas the orthogonally polarized mode is attenuated (the function of an optical waveguide polarizer).

This imposes a condition on the refractive index values such that either $$n_{1,Eff\ Hor} = n_{2,Eff\ Hor}; \text{ or}$$

$$n_{1,Eff\ Vert} = n_{2,Eff\ Vert}.$$

As described in FIG. 2, the optical-fiber-based polarizer includes:

A periodic/aperiodic (chirped, quasi-periodic) modulation of the effective index of refraction (in one or more sections of the optical fiber) as sensed exclusively by one principal state of polarization of the core mode propagating in the fiber. The sections exhibiting modulation of the effective index of refraction are distinguished by a modulation of the dielectric properties of the fiber along the direction of propagation of the light (the longitudinal axis of the fiber). We term these sections the affected sections. The modulation of the dielectric properties of the fiber is such that it introduces periodic/aperiodic birefringence along the direction of propagation of the light, such a modulation being confined to the vicinity of the core region of the fiber, such that there is substantial overlap between the core mode and the modulated region;

A constant (un-modulated) effective index of refraction of the core region of the fiber (in the affected sections—those exhibiting modulation of the effective index of refraction affecting one principal state of polarization) as sensed by the orthogonal principal state of polarization of the light propagating in the fiber; and A means to attenuate light that is coupled by the periodic modulation to the cladding or radiation modes of the fiber.

Of central importance to the present invention is to do one or more of the following in order to introduce mode-dependent attenuation in the fiber:

Surrounding the fiber (over or downstream from affected sections) with an absorber, which can absorb cladding modes and radiation modes. Such an absorber will not affect significantly the propagating properties of propagating light that remains essentially bound to the core of the fiber.

Index matching the absorber to the cladding's index of refraction over a section of the fiber (over or downstream from affected sections).

Making the cladding modes "leaky" by surrounding the cladding over a section of the fiber (over or downstream from affected sections) with material whose index of refraction is larger that of the cladding.

Figure 3:
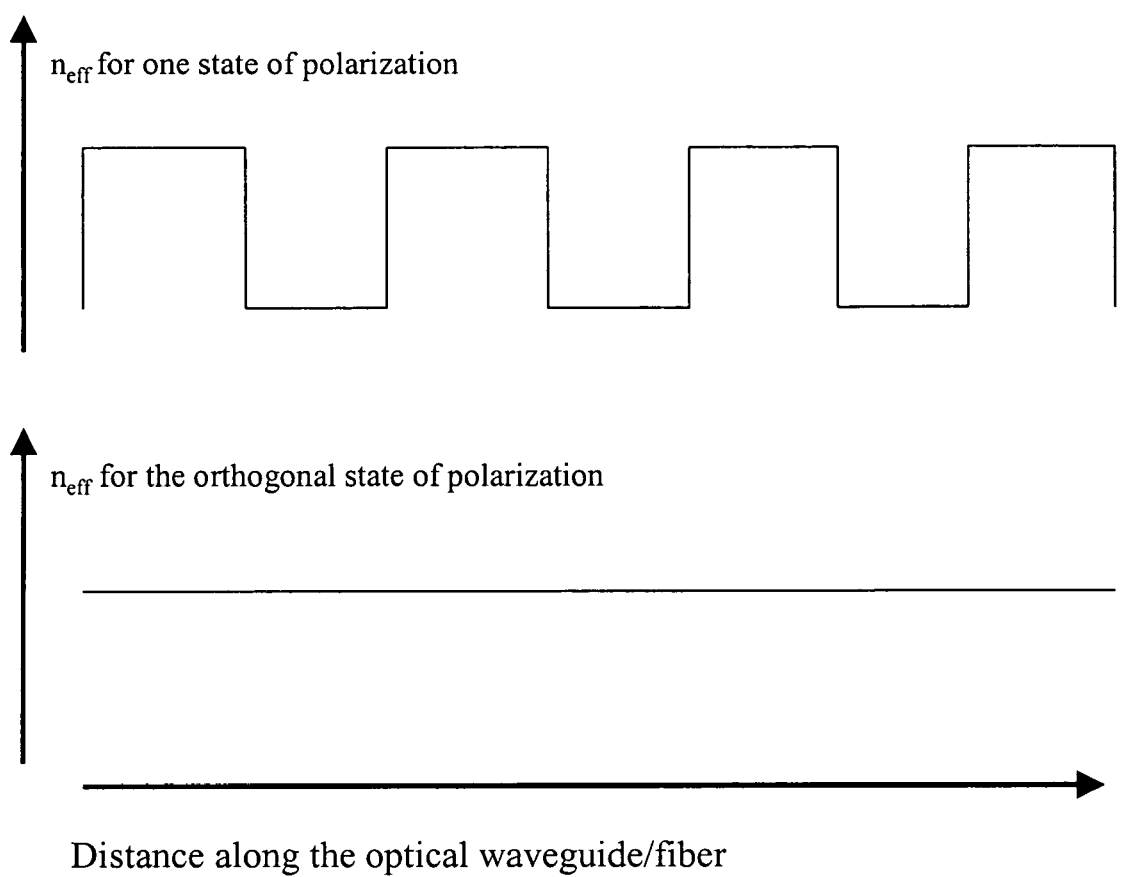
FIG. 3 depicts the spatial dependence of the indices of refraction along the axis of the fiber of FIG. 2 for the two principal states of polarization.

FIG. 3 illustrates the spatial dependence of the refractive indices for the two principal states of polarization along the fiber axis. The periodic modulation of the effective index of refraction of the core region that is sensed by only one principal state of polarization (not the orthogonal state) serves to resonantly couple that light to a cladding mode or to the continuum of radiation modes of the fiber usually of the same polarization. A typical fiber supports hundreds of cladding modes and a continuum of radiation modes. The coupling is a direct consequence of momentum conservation requirements. Light that has been converted to a cladding mode or to the continuum of radiation modes will be affected by the complex dielectric properties (index of refraction and extinction coefficient) of the material surrounding the cladding of the fiber. Light that remains core-bound will not be significantly affected. Thus polarization-preferential coupling of a core bound mode with one state of polarization to a cladding mode, or to the continuum of radiation modes, results in preferential attenuation of the light in that core-bound mode.

Light of the orthogonal state of polarization will propagate undisturbed in the core of the fiber with little or no attenuation. Thus, one state of polarization is not attenuated whereas the other is.

Such a structure acts as a polarizer, since polarization dependent loss is the fundamental property of a polarizer. A polarizer strives to have the lowest possible loss for one state of polarization and to have the highest possible loss for the orthogonal state.

Design Wavelength of Operation, Design Coupling Length and Normalized Bandwidth

To achieve resonant coupling of the guided mode to a cladding mode, a long period grating can be formed by modulating the refractive index for the corresponding polarization state. The design wavelength of operation of the long period grating $\lambda_d$ is:

$$\lambda_d = \Delta n_{eff} \cdot \Lambda$$

where $\Lambda$ is the pitch of the grating.

The coupling length is the length of fiber over which the refractive index of the core needs to be altered periodically to achieve high loss, which is a function of the modulation depth of the index of refraction of the fiber. Given a modulation depth and a wavelength of operation, a coupling constant, $\kappa_l$, exists for a given fiber that determines the design coupling length of the polarizer, $L_d$:

$$L_d = \frac{\pi}{2\kappa}$$

The coupling constant, $\kappa_l$ is a function of the fiber parameters, the strength of the refractive index modulation, and of the cladding mode that is excited at the central wavelength of operation of the polarizer.

The normalized bandwidth of a uniform long period grating is given by:

$$\frac{\Delta \lambda_0}{\lambda} = \frac{2\lambda}{\Delta n_{eff} L} \sqrt{1 - \left(\frac{\kappa L}{\pi}\right)^2}$$

where $\Delta \lambda_0$ is the separation between the first zeros on either side of the resonant spectral peak, $\lambda$ is the central wavelength of the peak, $\Delta n_{eff}$ is the difference in the effective refractive indices of the two coupled modes that are coupled by the long period grating, L is the length of the long period grating.

Assuming that:
The average refractive index of the periodic modulation is the original index of refraction of the core, namely 1.4519;
The other properties of the optical fiber are those listed above;
Air (index of refraction=1.0) surrounds the cladding of the fiber;
Such light couples to the lowest order circularly symmetric mode of the cladding;
The central wavelength of operation of the polarizer is 1310 nm;
The refractive index modulation amplitude (sensed by the light in the fiber core as the light propagates in the appropriate principal state of polarization) measured in the core of the fiber is $7 \times 10^{-4}$;
The absorbing and index matching material surrounding the cladding is located downstream from the section of the fiber that has been modified according to the present invention;

We obtain, for operation/resonance on the lowest order circularly symmetric mode of the cladding (designated the $\nu=1$ cladding mode):

A coupling period of approximately 500 microns

A design coupling length of approximately 2 cm

An operating spectral width for the polarizer of approximately 60 nm.

Figure 5:
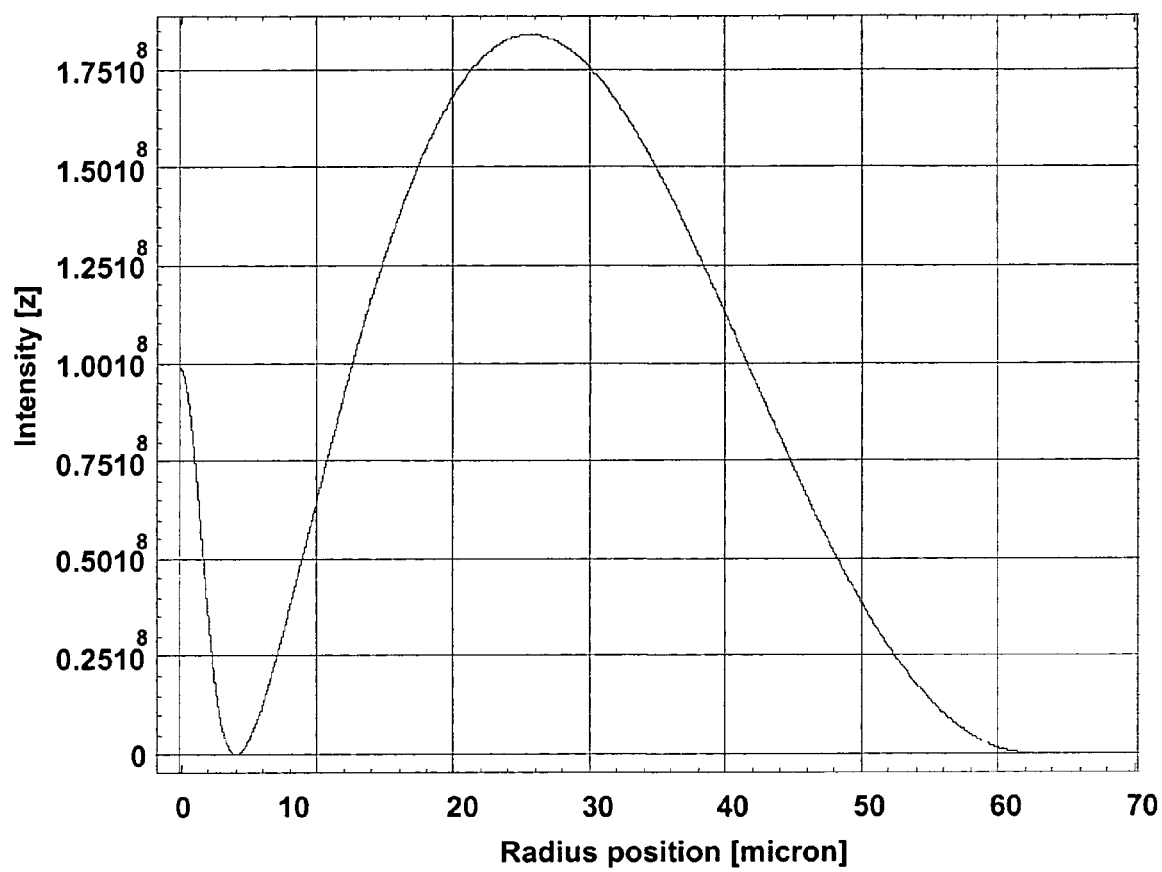
FIG. 5 displays the radial electromagnetic field intensity dependence for a $\nu=1$ cladding mode.

FIG. 5 plots the radial electromagnetic field intensity dependence for this $\nu=1$ cladding mode.

Alternatively, we obtain, for operation/resonance on the seventh lowest order circularly symmetric mode of the cladding (designated the $\nu=7$ cladding mode):

A coupling period of approximately 400 microns

A design coupling length of approximately 0.6 cm

An operating spectral width for the polarizer of approximately 150 nm

For a given refractive index modulation amplitude there is advantage to operating the device in a higher order cladding mode. In the above example, for approximately the same coupling period, a significantly shorter device can be fabricated operating with $\nu=7$ rather than the for $\nu=1$ by coupling 100% of the core guided light in the appropriate state of polarization to the corresponding cladding mode. Shorter devices intrinsically have a broader bandwidth of operation.

The larger the refractive index modulation, $\Delta n_{eff}$, the larger is the corresponding value of $\kappa$ and, consequently, the shorter will be the design coupling length of the device needed to effect 100% conversion of core-guided light into the resonant cladding mode. If a situation should arise where the modulation amplitude that can be induced in the core of the fiber/waveguide is too low to yield a large enough operating bandwidth, it may be necessary to "chirp" the period of the modulation, that is to make the modulation aperiodic. Chirping is a well-known method of increasing the bandwidth of operation of periodic structures.

Methods for Increasing the Operating Bandwidth of the Polarizer

The operating optical bandwidth of the polarizer is the bandwidth over which core-guided light is converted efficiently to cladding-guided light or to the radiation modes. The methods available for increasing the operating bandwidth of the polarizer (when it is designed to couple resonantly to a cladding mode rather than to a radiation mode) include:

Increasing the modulation index of the dielectric properties of the fiber sensed exclusively by one principal state of polarization of the core-guided mode to allow for a shorter device. This action decreases the Q, or the normalized bandwidth, of the resonant coupling process.

Making the cladding modes in the affected region(s) leaky or lossy. This action also decreases the Q of the resonant coupling process.

Inducing aperiodic (chirped, quasi-periodic) modulation of the dielectric properties of the fiber in the affected region(s) and possibly increasing the length of the device to compensate for the reduced effective length of the coupling.

Couple to the continuum of radiation modes.

A combination of the above methods.

The methods of broadening the response outlined above are guiding principles. The complete design of the polarizer requires that Maxwell's Equations be solved to quantify the mode coupling process as it occurs in the particular structure under study. Maxwell's Equations for periodic structures lead naturally to coupled mode equations that describe modal field amplitudes in terms of the modes that the structure supports. Methods for solving the coupled mode equations are widely available in the literature. Uniform periodic long period in-fiber/waveguide gratings can be solved analytically, while numeric methods are more practical for aperiodic/chirped structures. These methods include synthesis techniques, which yield the pitch and coupling length dependence of the long period grating that is required to achieve a given spectral response.

Methods of Fabrication

There are several ways that can be used to fabricate a fiber/waveguide polarizer.

Fiber sections can be spliced together to make a polarizer. In principle, it is possible to design and fabricate two special monomode polarization-maintaining fibers for this purpose. The fiber parameters and the optical alignment of the fibers, when sections of the two fibers are spliced together, must be chosen to render the coupling of the core guided mode to cladding/radiation modes at a splice highly polarization sensitive. All that is necessary is to match the magnitude of one pair of effective indices for the two fibers, similar to conditions previously indicated in FIG. 2. The goal is to ensure that one principal polarization "sees" the splice whereas the orthogonal principal polarization does not. Thus, if the guided light is affected by the splice then it "sees" the splice. If the guided light is substantially unaffected by the splice, that is, continues to be core guided without coupling to other (i.e. cladding/radiation) modes then the light does not "see" the splice. One period of the polarizer is made by splicing together two spans, one from each fiber, of the right length. Typically each fiber span will be half the length of the design period of the structure, □ with proper attention to the alignment of the principal birefringence axes of the fiber pairs. Cladding mode loss is then introduced to complete the polarizer. Although it would be possible to make such a polarizer, it would be expensive and probably not practical.

Another general method is to take standard telecommunications fiber, such as Corning Inc. SMF-28 fiber, and modulate the birefringence of the core using birefringence inducing actinic radiation. Actinic radiation is any radiation that is capable of changing the index of refraction of materials used to fabricate optical fibers/waveguides. Birefringence inducing actinic radiation is any radiation that is capable of inducing birefringence, under certain circumstances, in materials used to fabricate an optical fiber/waveguide. Experimental methods and data from the literature can be employed to determine the exposure conditions that result in controlled photo-induced birefringence of a magnitude needed to implement the polarizer employing a particular type of optical fiber or waveguide.

It is well know that exposure of the core of a Germanium-doped-core fiber to ultraviolet radiation (for example, 240 nm UV light, 330 mJ/cm$^2$/pulse, 15 nsec pulse width, 30 sec$^{-1}$ pulse repetition frequency for several minutes) from the side leads not only to a change in the index of refraction of the core (which arises from a combination of local electronic defects, compaction and fusion of the glass matrix depending on experimental variables), but also to photo-induced birefringence in the core. The birefringence that is obtained typically is about $5 \times 10^{-5}$. The birefringence is attributed to shape birefringence (loss of $\pi/2$ symmetry about the longitudinal axis of the fiber/waveguide) and to material birefringence created by the exposure to the radiation.

The photo-induced birefringence is a function of the polarization of the actinic light beam incident on the fiber. Actinic light polarized parallel to the longitudinal axis of the fiber results in minimal birefringence, whereas actinic light polarized orthogonally to the longitudinal axis can result in significant birefringence. In both cases the index of refraction of the illuminated section of the fiber is changed.

The photo-induced birefringence is also a function of the direction of incidence of the actinic light beam incident on the fiber. The direction determines the direction of the axes of the photo-induced birefringence.

To photo-imprint a section of fiber with an index of refraction change and simultaneously minimize photo-induced birefringence, the fiber should be exposed from the side to approximately equal doses of actinic radiation incident from two directions at right angles to one another. Or, if necessary for further reduction in photo-induced birefringence, to expose symmetrically from four directions ($\pi/2$ symmetry) and at right angles to the axis of the fiber.

To photo-induce an index of refraction change in a section of fiber and simultaneously photo-induce birefringence, the actinic radiation should be incident from one direction at right angles to the fiber axis and be polarized at right angles to the fiber axis.

It is possible to enhance the photo-induced birefringence by pre-stressing the waveguide during exposure to actinic radiation. The allowable pre-stressing is limited the compressive strength of the waveguide material in compression and to the tensile strength in tension.

For fused silica:

Compressive Strength=1100 MPa;

Tensile Strength=50 MPa.

By controlling the exposure conditions and the level and polarity of the applied stress control over the photo-induced birefringence is possible.

Figure 4:
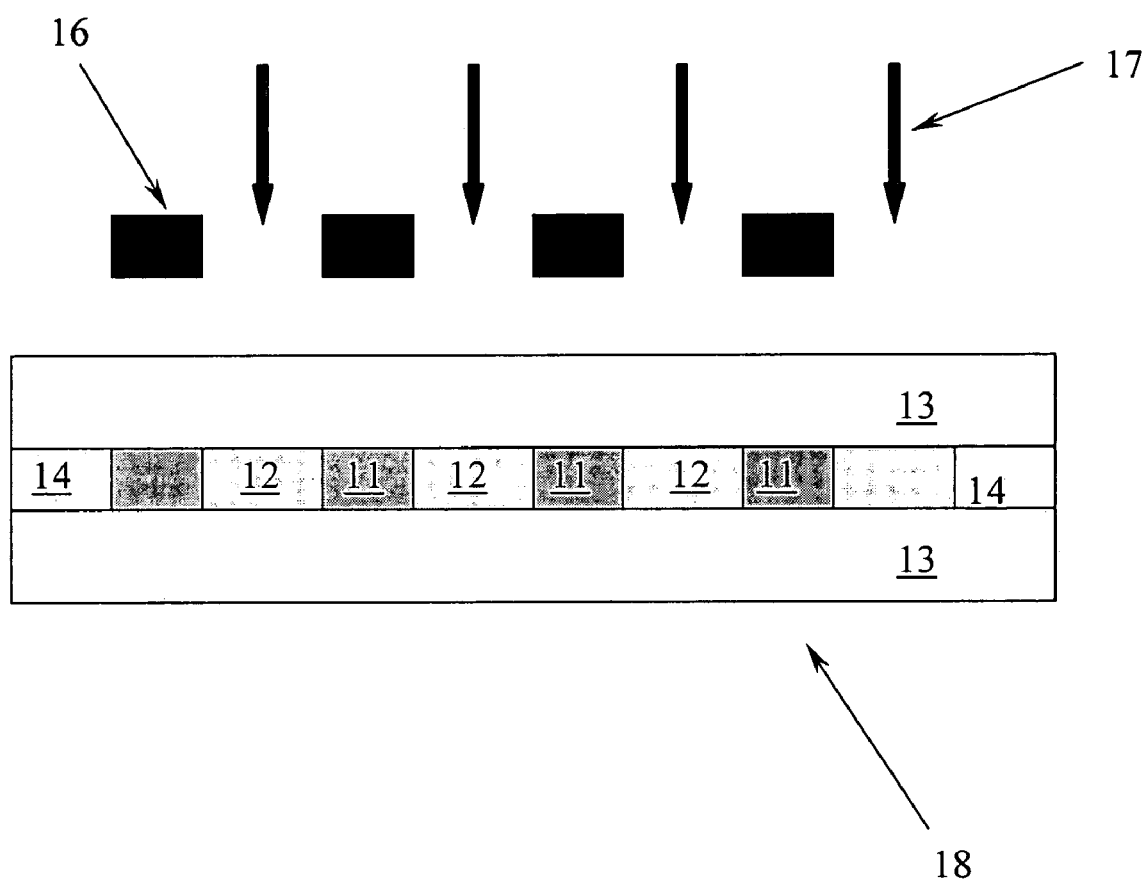
FIG. 4 describes a photo-imprinting process by actinic radiation incident through a slit mask to induce birefringence in accordance with the present invention.

To conveniently construct an embodiment of the present invention as described in FIG. 2, actinic radiation can be applied through a shadow mask. With reference to FIG. 4, the actinic radiation 17 is applied to the single mode fiber 18 through a shadow mask 16. For clarity, only one direction of actinic radiation is shown, although in practice there could be more than one. The actinic radiation 17 passes through the cladding layer 13 and modifies the refractive index of core sections 12 as described previously. Core sections 11 lying within the shadow of mask 16 are unaffected by the radiation.

I claim:

1. A method of fabricating an optical polarizer comprising an optical waveguide having a core and a cladding, and
a plurality of sections with periodically or quasi periodically varying birefringence, in or near the core for coupling light of a first polarization state out of the waveguide, while guiding light of a second polarization state therethrough substantially unaltered, wherein, in absence of microbending, an effective mode index varies between contiguous sections for the first polarization state, and not for the second polarization state, the method comprising the ordered steps of:

a) providing a length of the optical waveguide having a longitudinal axis;

b) applying an external stress transversely to the longitudinal axis of the optical waveguide in accordance with a desired change in birefringence;

c) irradiating regions of the optical waveguide with radiation capable of photosensitively changing its index of refraction, while maintaining the applied stress so as to induce a desired change in birefringence in the waveguide regions; and, d) releasing the external stress applied to the optical waveguide.

2. A method of fabricating the optical polarizer as defined in claim 1, wherein the waveguide provided in step a) is a section of standard telecommunications optical.

3. A method of fabricating the optical polarizer as defined in claim 1, wherein in step c) the waveguide is irradiated through a shadow-mask which is positioned over the sections of optical waveguide where no modification of birefringence is required.

4. A method of fabricating the optical polarizer as defined in claim 1, wherein in step c) the radiation is polarised.

5. A method of fabricating the optical polarizer as defined in claim 1, wherein in step c) the radiation is focused to a focal volume within the optical waveguide.

6. A method of fabricating the optical polarizer as defined in claim 5, wherein the focal volume is linearly translated along the longitudinal axis of the optical waveguide to produce sections of altered birefringence in the optical waveguide.

7. A method of fabricating an optical polarizer comprising an optical waveguide having a core and a cladding, and a plurality of sections with periodically or guasi periodically varying birefringence, in or near the core for coupling light of a first polarization state out of the waveguide, while guiding light of a second polarization state therethrough substantially unaltered, wherein, in absence of microbending, an effective mode index varies between contiguous sections for the first polarization state, and not for the second polarization state, the method comprising the ordered steps of:

a) providing a length of the optical waveguide having a longitudinal axis;

b) applying stress transversely to the longitudinal axis of the optical waveguide in accordance with a desired change in birefringence;

c) irradiating regions of the optical waveguide with radiation capable of changing its index of refraction, while maintaining the applied stress so as to induce a desired change in birefringence in the waveguide regions; and, d) releasing the stress applied to the optical waveguide;

wherein an optically absorbing coating is applied on the exterior of the optical waveguide for absorbing light that is coupled out of the optical waveguide core.

* * * * *